(12) United States Patent
Yoshimoto

(10) Patent No.: US 9,120,161 B2
(45) Date of Patent: Sep. 1, 2015

(54) CENTER HOLE MACHINING METHOD FOR SHAFT BLANK AND CENTER HOLE MACHINING APPARATUS

(75) Inventor: Akihiro Yoshimoto, Komatsu (JP)

(73) Assignee: KOMATSU NTC LTD., Toyama (JP)

( * ) Notice: Subject to any disclaimer, the term of this patent is extended or adjusted under 35 U.S.C. 154(b) by 659 days.

(21) Appl. No.: 13/517,209

(22) PCT Filed: Jan. 21, 2011

(86) PCT No.: PCT/JP2011/051044
§ 371 (c)(1),
(2), (4) Date: Jun. 19, 2012

(87) PCT Pub. No.: WO2011/093210
PCT Pub. Date: Aug. 4, 2011

(65) Prior Publication Data
US 2012/0259452 A1     Oct. 11, 2012

(30) Foreign Application Priority Data
Jan. 28, 2010   (JP) ................................. 2010-016254

(51) Int. Cl.
*G05B 19/19*     (2006.01)
*B23B 49/04*     (2006.01)
(Continued)

(52) U.S. Cl.
CPC ................ *B23B 49/04* (2013.01); *B23Q 17/20* (2013.01); *B23Q 17/2233* (2013.01); *G05B 19/402* (2013.01); *B23B 2215/16* (2013.01); *G05B 2219/45148* (2013.01); *G05B 2219/49113* (2013.01)

(58) Field of Classification Search
CPC .... B23B 49/04; B23B 2215/16; B23Q 17/20; B23Q 17/2233; G05B 19/402; G05B 2219/45148; G05B 2219/49113
See application file for complete search history.

(56) References Cited

U.S. PATENT DOCUMENTS 4,300,197 A      11/1981   Schonfeld et al.
5,713,253 A *     2/1998   Date et al. ...................... 82/1.11
(Continued)

FOREIGN PATENT DOCUMENTS

JP       54-6188        1/1979
JP       55-497 A       1/1980
(Continued)

OTHER PUBLICATIONS

International Search Report of corresponding PCT Application No. PCT/JP2011/051044.

*Primary Examiner* — Charles Kasenge
(74) *Attorney, Agent, or Firm* — Global IP Counselors, LLP

(57) ABSTRACT

A center hole machining method includes first to fifth steps. The first step includes obtaining outer peripheral shape data of a plurality of portions of the shaft blank in an axial direction. The second step includes obtaining a center axis by comparing measured data of the portions of the shaft blank with design data. The third step includes calculating a minimum distance from the center axis to the outer periphery in each of the portions of the shaft blank. The fourth step includes shifting the center axis in a direction of making the minimum distance greater than the machining dimension and repeatedly executing the third step when the minimum distance is less than or equal to the machining dimension. The fifth step includes boring the center hole in an end surface of the shaft blank at a position arranged on a line extended from the center axis.

5 Claims, 12 Drawing Sheets

(51) Int. Cl.
*B23Q 17/20* (2006.01)
*B23Q 17/22* (2006.01)
*G05B 19/402* (2006.01)

(56) References Cited

U.S. PATENT DOCUMENTS 6,008,840 A * 12/1999 Jin et al. .................... 348/87
6,952,074 B2 * 10/2005 Nagaura .................... 310/361
8,424,426 B2 * 4/2013 Kume et al. ................ 82/1.11
2010/0179675 A1 * 7/2010 Yoshimoto .................. 700/98

FOREIGN PATENT DOCUMENTS

| JP | 9-174382 A | 7/1997 |
| JP | 2009-279734 A | 12/2009 |
| WO | WO-2009/016988 A1 | 2/2009 |
| WO | WO 2009125638 A1 * | 10/2009 |

* cited by examiner

FIG. 7A

| OPERATIONS OF MACHINE | ILLUSTRATION OF MACHINE OPERATIONS (WORK POSITION IS CONSTANT) |
|---|---|
| S1 — LOADING OF WORK<br>WORK IS LOADED TO CENTER POSITION AND THEN CLAMPED FOR EXECUTING LONGITUDINAL POSITIONING | 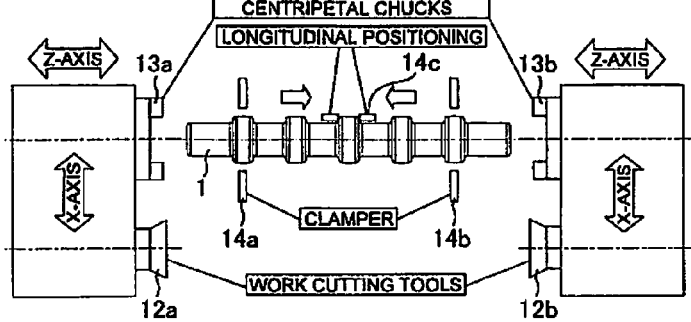 |
| S2 — THIRD CLAMPER UNCLAMPS WORK WHILE FIRST AND SECOND CLAMPERS CLAMP WORK BEFORE CHUCKING. | 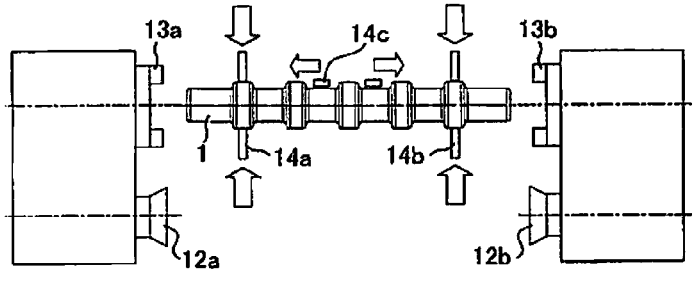 |
| S3 — WHILE MAIN CLAMPER CLAMPS WORK, CENTRIPETAL CHUCKS ARE MOVED FORWARDS IN Z-AXIS DIRECTION AND THEN CHUCK WORK | 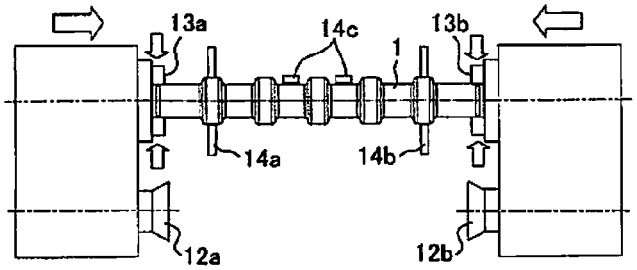 |
| S4 — MAIN CLAMPER UNCLAMPS WORK | 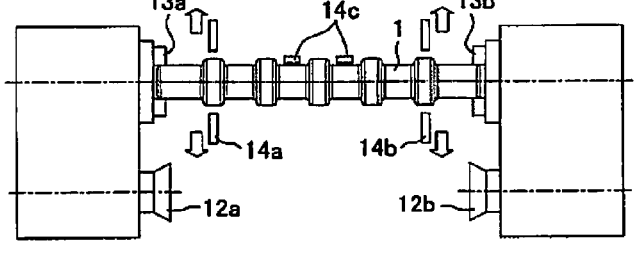 |
| S5 — LASER DISPLACEMENT METER MEASURES SHAPE OF WORK | 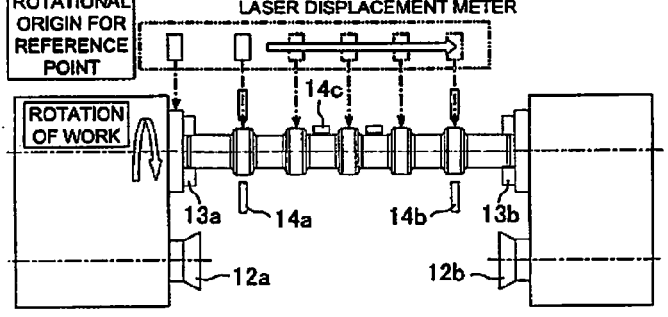 |

(a)          (b)

CENTER HOLE MACHINING METHOD FOR SHAFT BLANK AND CENTER HOLE MACHINING APPARATUS

CROSS-REFERENCE TO RELATED APPLICATIONS

This application claims priority to Japanese Patent Application No. 2010-016254 filed on Jan. 28, 2010, the disclosure of which is hereby incorporated herein by reference in its entirety.

TECHNICAL FIELD

The present invention relates to a center hole machining method, particularly to a center hole machining method for boring a center hole in a shaft blank formed by means of forging or casting in machining the outer periphery of the shaft blank. Further, the present invention relates to a center hole machining apparatus using the center hole machining method.

BACKGROUND ART

For example, shaft blanks such as for a camshaft embedded in an engine are mainly formed by means for forging. In such a shaft blank, cutting and polishing processes are executed for the outer peripheral surfaces of cam portions and journal portions.

As a process preceding the aforementioned processes for the shaft blank, it is required to bore center holes as references for machining in the both end surfaces of the shaft blank. A variety of methods have been proposed as the methods of machining center holes.

In a method of Japan Laid-open Patent Application Publication No. JP-A-H09-174382, for instance, a true center position of a shaft blank is predicted based on the data obtained by measuring the shape of the shaft blank, and a center hole is bored in the true center position obtained by the prediction. Subsequently, machining is executed for the outer peripheral portion and etc. of the shaft blank using the center hole.

On the other hand, in a method of PCT International Publication No. WO2009/016988A1, the three-dimensional shape data of a shaft blank (crankshaft blank) is obtained and a center hole position of the shaft blank is temporarily determined based on the three-dimensional shape data. Next, machining of the shaft blank is simulated based on the temporarily determined center hole position. The simulated post-machining shape is specified for the shaft blank. Further, it is determined whether or not the simulated post-machining rotational balance of the shaft blank falls within an allowable range. When it is determined that the rotational balance falls within the allowable range, the temporarily determined center hole position is set as a center hole position for actual machining.

SUMMARY

As described above, in the well-known center hole machining methods, the center hole position of the shaft blank is determined for mainly reducing rotational imbalance after machining.

However, the aforementioned well-known arts do not address at all reduction in machining allowance of the shaft blank for reducing material cost. Explanation will be hereinafter given in this regard.

In forming a shaft blank by means of forging or casting, it is not necessarily true that machining allowance is reliably produced uniformly on the surface of the shaft blank. This is due to defect, misalignment, deformation and etc. of the molds. Therefore, in machining a shaft blank formed by means of forging or casting, sufficient machining allowance is reliably produced on the shaft blank so that the blank surface can be eliminated from the shaft blank formed by means of forging or casting even after machining. However, it has been required in recent years to reduce machining allowance as much as possible for reducing material cost. When machining allowance is reduced, the blank surface may remain even after the shaft blank is machined.

More detailed discussion will be hereinafter given regarding the fact that the blank surface remains after machining as a result of reduction in machining allowance.

In machining center holes in a shaft blank, the shaft blank surface is clamped at two opposed positions by a stationary clamper member and a pivot clamper member. Center holes are allowed to be bored in the center of the shaft blank when the shaft blank is finished in an ideal shape satisfying design values. In this case, such a situation can be avoided that the blank surface is left uneliminated even in the subsequent machining process due to a remarkably small amount of machining allowance.

In practical situations, however, the shaft blank cannot be necessarily finished in a shape satisfying design values due to the following factors such as deficit of forging/casting molds in fabricating the shaft blank.

(1) The top and bottom molds are separated away from each other due to the excessive amount of material and this results in an entirely thick shaft blank.

(2) The top and bottom molds are misaligned and this results in a shaft blank with a horizontally misaligned shape.

(3) The top and bottom molds are slanted from each other and a shaft blank having a non-uniform thickness is thereby produced.

(4) Combinations of (1) to (3).

(5) A shaft blank is bent in pulling the shaft blank out of the molds, in executing a processing after molding, and etc.

When the portions of the shaft blank to be clamped are distorted due to the aforementioned factors, the shaft blank is moved or rotated in clamping and thereby cannot be accurately clamped. FIG. 1 illustrates the condition. Specifically, FIG. 1 illustrates a condition that a shaft blank 1 is clamped by a stationary clamper member 2 and a pivot clamper member 3. When making contact with the shaft blank 1, the pivot clamper member 3 is configured to oscillatingly pivot for automatically adjusting the clamping axis of the shaft blank 1.

FIG. 1A illustrates a clamped state of a shaft blank finished in an ideal shape. In this case, the shaft blank 1 has an approximately true circular shape. Therefore, the clamping center of the shaft blank 1 is matched with the geometric center of the shaft blank 1. FIGS. 1B and 1C illustrate clamped states of the shaft blank 1 finished in a misaligned shape. Firstly, pawls of the both clamper members 2 and 3 partially make contact with the shaft blank 1 as illustrated in FIG. 1B when the shaft blank 1 is finished in a misaligned shape. When the clamping action further proceeds from the condition, the pivot clamper member 3 pivots for automatically adjusting the clamping axis of the shaft blank 1 as illustrated in FIG. 1C. Consequently, misalignment is produced between an actual center C1 of the shaft blank 1 and a clamping center C2.

In machining center holes under the condition as illustrated in FIG. 1C, the center holes cannot be bored in the center of the shaft blank. Especially when the machining allowance (a hatched region in FIG. 2) is reduced for material cost reduction, the blank surface is left uneliminated after machining as illustrated in FIG. 2.

Next, a drawback of a deformed shaft blank will be explained. The center of a shaft blank is normally determined based on the clamped portions of the shaft blank. When deformation of a shaft blank is considered, it is preferable as illustrated in FIG. 3A to clamp the shaft blank 1 at two positions that the distance therebetween corresponds to 60-70% of the entire length of the shaft blank 1 and to bore center holes in the both end surfaces of the shaft blank 1 at positions arranged on a conceptual line extended from the geometric centers set at the clamped positions of the shaft blank 1. Accordingly, machining allowance can be roughly uniformly set over the entire length of the shaft blank. In this case, however, the shaft blank tends to be wobbled in milling the both end surfaces thereof due to relatively long distance set from the end surfaces of the shaft blank to be actually milled to the camped positions thereof.

By contrast, the blank surface may remain on the shaft blank 1 after machining when the shaft blank 1 is clamped at positions closer to the both end surfaces thereof for inhibiting the shaft blank 1 from being wobbled in machining the end surfaces of the shaft blank 1 as illustrated in FIG. 3B. The reason is that center holes are herein bored in the both end surfaces of the shaft blank 1 at positions arranged on a conceptual line extended from the geometric centers of the shaft blank 1 at the clamped positions thereof, and in some instances, no machining allowance may be produced in the vicinity of the axial center of the shaft blank 1.

To solve the aforementioned drawbacks, a countermeasure may be executed that a few shaft blanks are firstly machined in a target lot for grasping tendency of shape misalignment of the shaft blanks and center holes are bored in the remaining shaft blanks in the same lot after center hole machining positions are corrected by the misalignment. In such a method, however, it is required to uselessly machine shaft blanks for grasping tendency of shape misalignment of shaft blanks every time another lot becomes a machining target and tendency of shape misalignment of the shaft blanks varies.

It is an object of the present invention to provide a center hole machining method and a center hole machining apparatus whereby the blank surface can be entirely eliminated from a shaft blank after machining even when the machining allowance of the shaft blank is set to be small.

A center hole machining method for a shaft blank according to a first aspect of the present invention is configured to machine a center hole for processing an outer periphery of a shaft blank formed by forging or casting. The center hole machining method includes first to fifth steps. The first step is a step of obtaining outer peripheral shape data of a plurality of portions of the shaft blank in an axial direction. The second step is a step of obtaining a center axis for determining the center hole by comparing measured data of the plural portions of the shaft blank with design data corresponding thereto. The third step is a step of calculating minimum distance from the center axis to the outer periphery of each of the plural portions of the shaft blank. The fourth step is a step of: determining the center axis as an appropriate center axis when the minimum distance in each of the portions is greater than a machining dimension; and shifting the center axis in a direction of making the minimum distance greater than the machining dimension and repeatedly executing the third step based on the shifted center axis when the minimum distance is less than or equal to the machining dimension. The fifth step is a step of boring the center hole in an end surface of the shaft blank at a position arranged on a line extended from the center axis determined as the appropriate center axis.

In the present machining method, the center axis for determining a center hole is obtained by comparing the outer peripheral shape data and the design data. Next, the minimum distance from the center axis to the outer periphery is calculated in each of the plural portions of the shaft blank. When the minimum distance in each portion is greater than the machining dimension, a center hole is bored in an end surface of the shaft blank at a position arranged on a line extended from the center axis. When the minimum distance is less than or equal to the machining dimension, by contrast, the center axis is shifted in a direction of making the minimum distance greater than the machining dimension, and similarly to the above, the minimum distance is calculated for the plural portions based on the shifted center axis.

Therefore, no blank surface is left on the shaft blank after machining due to the aforementioned configuration that the center axis is shifted for making the minimum distance greater than the machining dimension in each portion and the center hole is then bored under the condition.

A center hole machining method for a shaft blank according to a second aspect of the present invention relates to the center hole machining method for a shaft blank according to the first aspect of the present invention. In the center hole machining method, the fourth step includes a step of determining the shaft blank as an inferior product and excluding the shaft blank from a machining line when the minimum distance remains less than the machining dimension even after the center axis is shifted at a predetermined number of times.

In this case, the shaft blank is excluded as an inferior deficit product from the machining line, for instance, when molds are largely misaligned and the blank surface inevitably remains on the shaft blank after machining no matter how the center axis is set.

A center hole machining method for a shaft blank according to a third aspect of the present invention relates to the center hole machining method for a shaft blank according to one of the first and second aspects of the present invention. In the center hole machining method, the second step is a step of obtaining a center axis for determining the center hole using a least-square method.

A center hole machining method for a material shaft according to a fourth aspect of the present invention relates to the center hole machining method for a shaft blank according to one of the first to third aspects of the present invention. In the center hole machining method, the fifth step includes: a milling step of milling both end surfaces of the shaft blank; and a drilling step of boring a center hole in each of the both milled end surfaces of the shaft blank.

A center hole machining apparatus for a shaft blank according to a fifth aspect of the present invention is configured to bore a center hole for machining an outer periphery of a shaft blank formed by forging or casting. The center hole machining apparatus includes a shape data obtaining unit, a center axis calculating unit, a minimum distance calculating unit, a center axis determining unit and a center hole machining unit. The shape data obtaining unit is configured to obtain outer peripheral shape data of a plurality of portions of the shaft blank in an axial direction. The center axis calculating unit is configured to obtain a center axis for determining the center hole by comparing measured data of the plural portions of the shaft blank with design data corresponding thereto. The minimum distance calculating unit is configured to calculate minimum distance from the center axis to the outer periphery of each of the plural portions of the shaft blank. The center axis determining unit is configured to: determine the center axis as an appropriate center axis when the minimum distance in each of the portions is greater than a machining dimension; and shift the center axis in a direction of making the minimum distance greater than the machining dimension and repeatedly execute the processing of calculating the minimum distance based on the shifted center axis when the minimum distance is less than or equal to the machining dimension. The center hole machining unit is configured to bore a center hole in an end surface of the shaft blank at a position arranged on a line extended from the center axis determined as the appropriate center axis.

According to the present invention as described above, it is possible to appropriately set a position of a center hole and prevent a blank surface from remaining on a shaft blank after machining even when the machining allowance of the shaft blank is set to be small. Therefore, material cost can be reduced.

BRIEF DESCRIPTION OF THE DRAWINGS

FIG. 7A is a part of an operational sequence diagram of the center hole machining machine.

DESCRIPTION OF THE EMBODIMENTS

1. First Exemplary Embodiment

Crankshaft Machining System

Figure 1A:
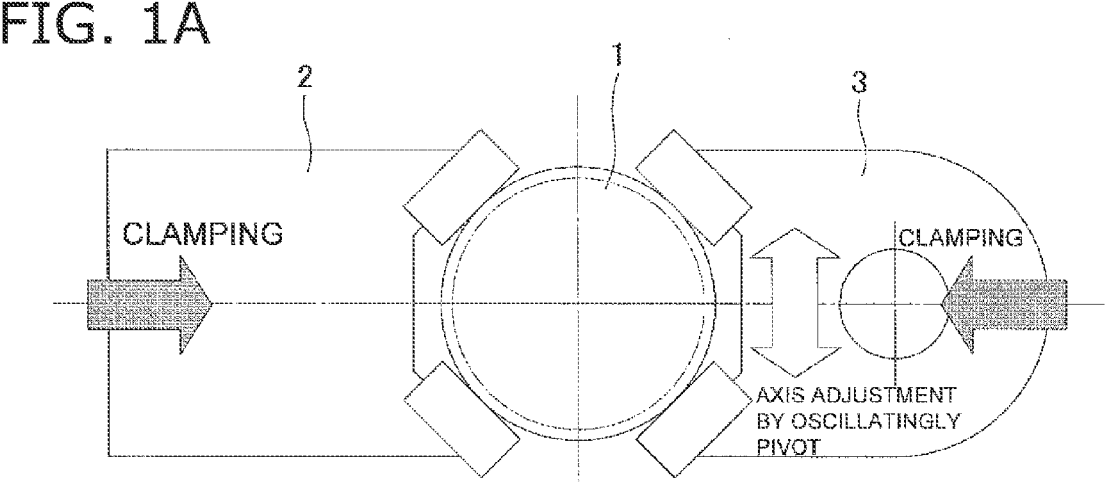
FIG. 1A is a diagram for explaining a problem attributed to misaligned material in clamping.
Figure 1B:
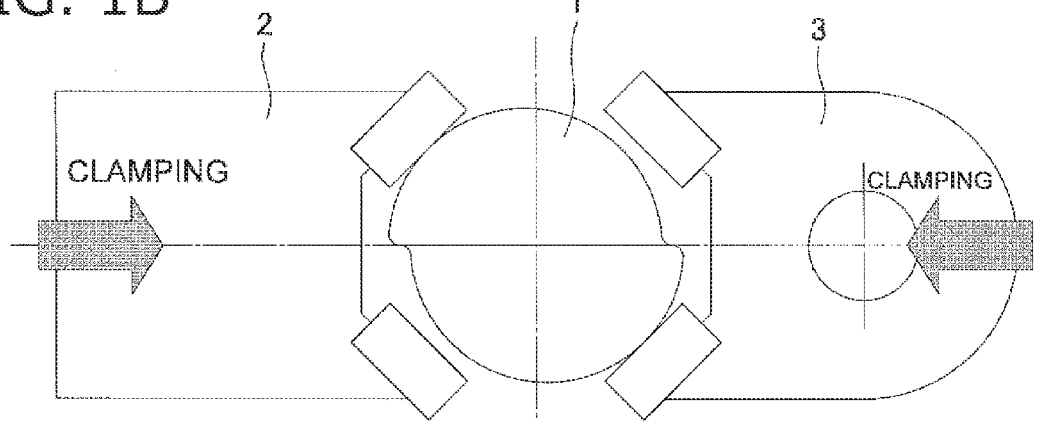
FIG. 1B is a diagram for explaining a problem attributed to misaligned material in clamping.
Figure 1C:
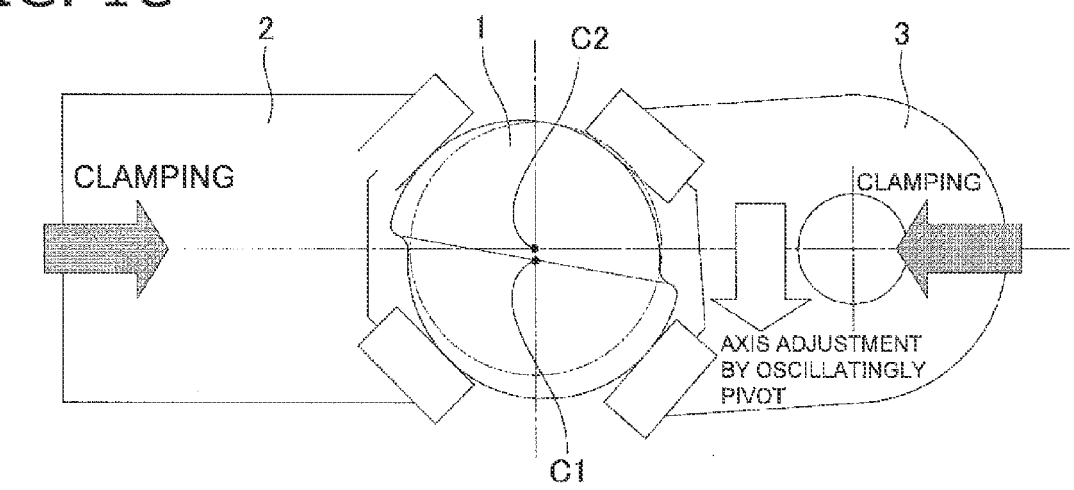
FIG. 1C is a diagram for explaining a problem attributed to misaligned material in clamping.
Figure 2:
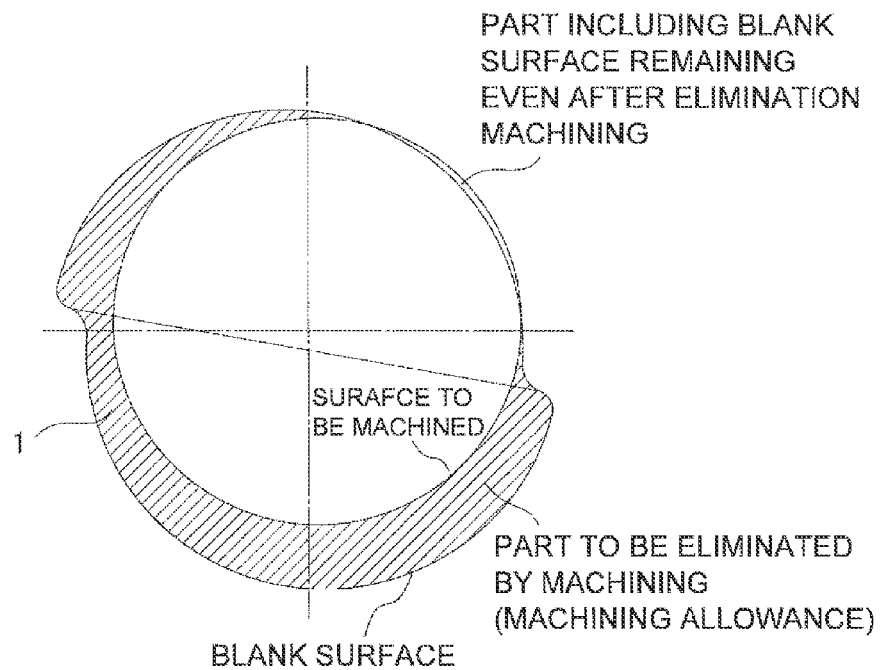
FIG. 2 is a diagram for explaining a problem attributed to misaligned material after machining.
Figure 3A:
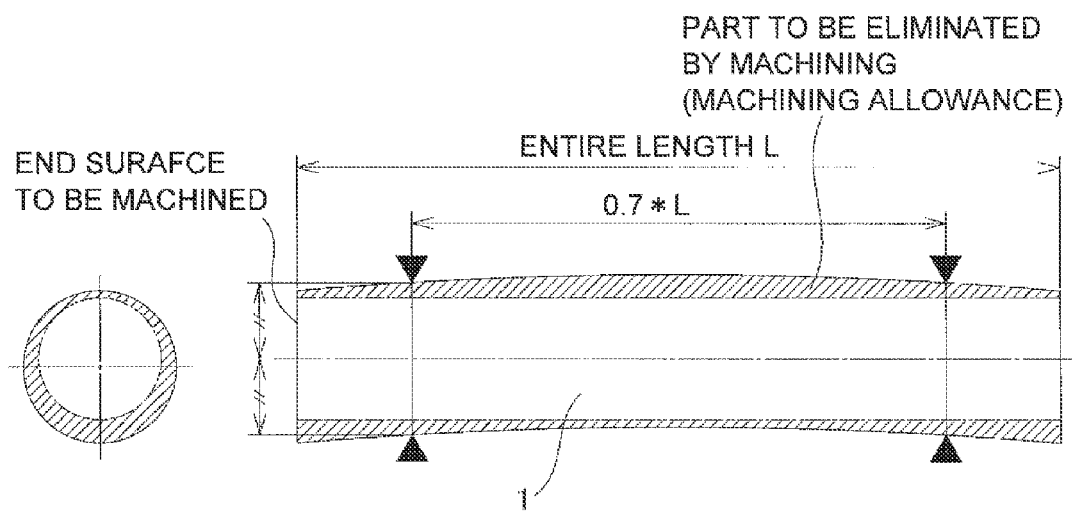
FIG. 3A is a diagram for explaining a problem attributed to clamping positions in machining an end surface.
Figure 3B:
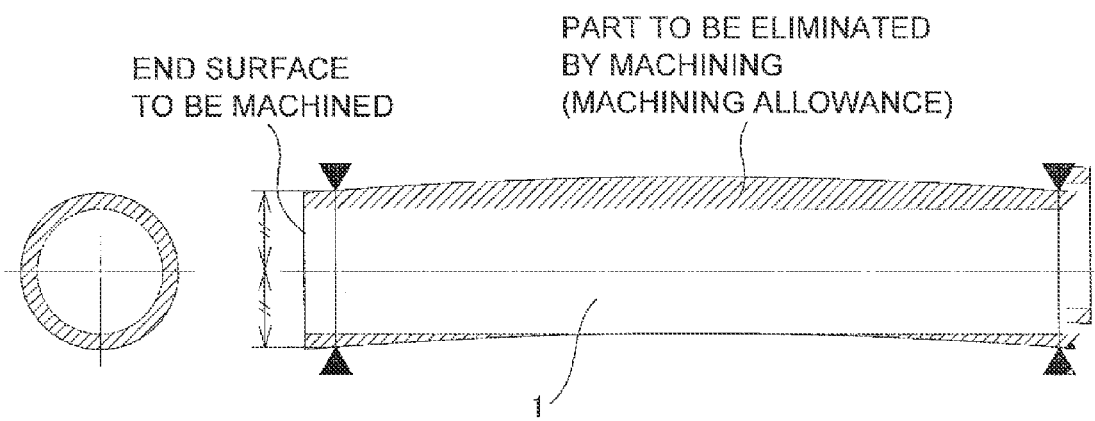
FIG. 3B is a diagram for explaining a problem attributed to clamping positions in machining an end surface.
Figure 4:
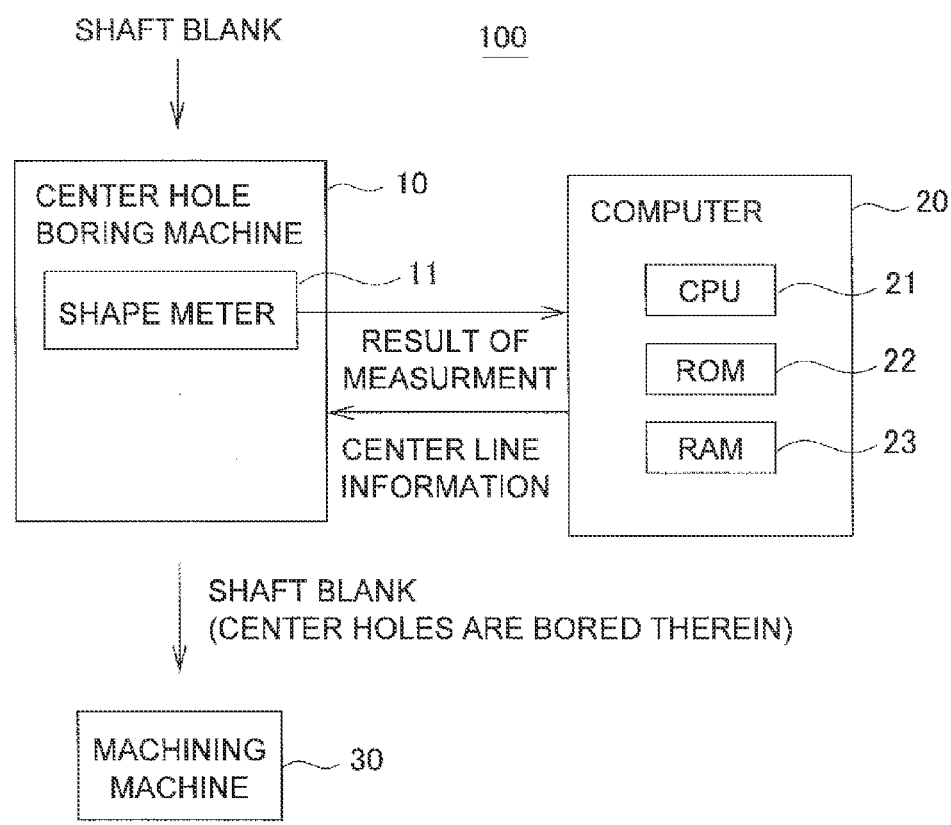
FIG. 4 is a configuration diagram of a machining system for a shaft blank.

FIG. 4 illustrates a shaft machining system including a center hole machining machine 10 according to an exemplary embodiment of the present invention. The shaft machining system 100 includes the center hole machining machine 10, a computer 20 and a machining machine 30. The center hole machining machine 10 is configured to bore a center hole in each of the both end surfaces of a shaft blank. The computer 20 is configured to execute a processing for determining the position of a center hole to be bored in each of the both end surfaces of the shaft blank. The machining machine 30 is configured to execute a predetermined working for the shaft blank after the center holes are bored in the shaft blank.

The center hole machining machine 10 includes a shape meter 11, which is an example of a shape data obtaining unit configured to measure the shape of a shaft blank.

The shape meter 11 includes, for instance, either a non-contact displacement meter (e.g., a laser displacement meter, an infrared displacement meter, an LED displacement sensor, etc.) or a contact displacement meter (e.g., a differential transformer). The shape meter 11 is configured to measure the shape of a shaft blank based on a value measured by the displacement meter. The measurement is conducted for a plurality of prospective machining portions of a shaft blank. The plural prospective machining portions may be simultaneously measured by a plurality of sensors. Alternatively, all the prospective machining portions may be measured by moving a single sensor. Further, a shaft blank may be measured using a single or plurality of stationary sensors while being rotated. Conversely, a shaft blank may be measured in a stationary state by either rotating or horizontally moving a single or plurality of sensors. It should be noted that the shape meter 11 may be a three-dimensional digitizer (i.e., an image scanner) configured to measure a measurement target from a plurality of different positions for generating three-dimensional shape data of the entire shape of a shaft blank.

The computer 20 includes a CPU (Central Processing Unit) 21, a ROM (Read Only Memory) 22 and a RAM (Random Access Memory) 23.

The ROM 22 is configured to store a variety of programs to be run by the CPU 21 and a variety of information. In the present exemplary embodiment, the ROM 22 is configured to preliminarily store a program for determining the positions of center holes to be bored in the shaft blank. Further, the ROM 22 is configured to preliminarily store the outer peripheral shape data of the shaft blank in a design phase (hereinafter referred to as "design data"). Yet further, the ROM 22 is configured to preliminarily store the content of machining to be executed for the shaft blank by the machining machine 30.

The RAM 23 is configured to be used as a storage area for storing programs and data, or as a work area for storing data to be used for the processing executed by the CPU 21.

Shaft Blank

Figure 5A:
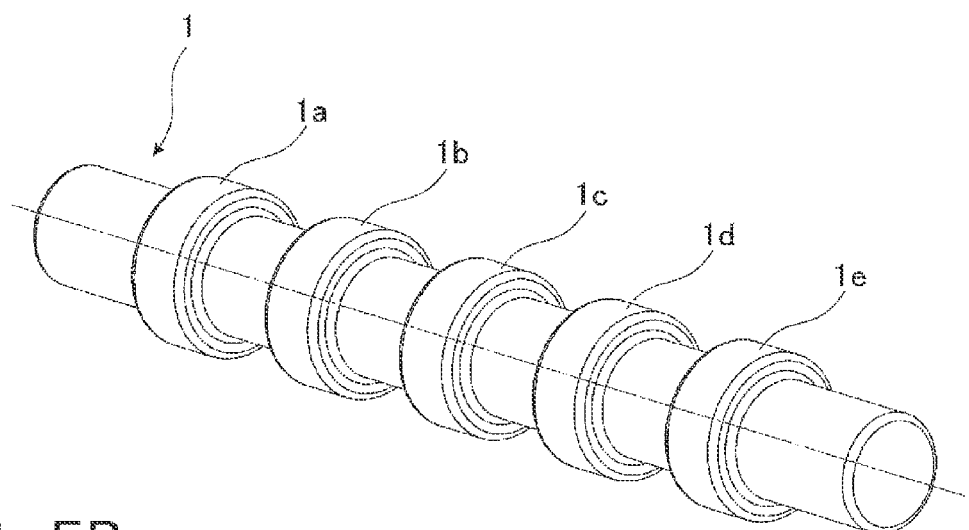
FIG. 5A is an external perspective view of an exemplary shaft blank that an exemplary embodiment of the present invention is applied.
Figure 5B:
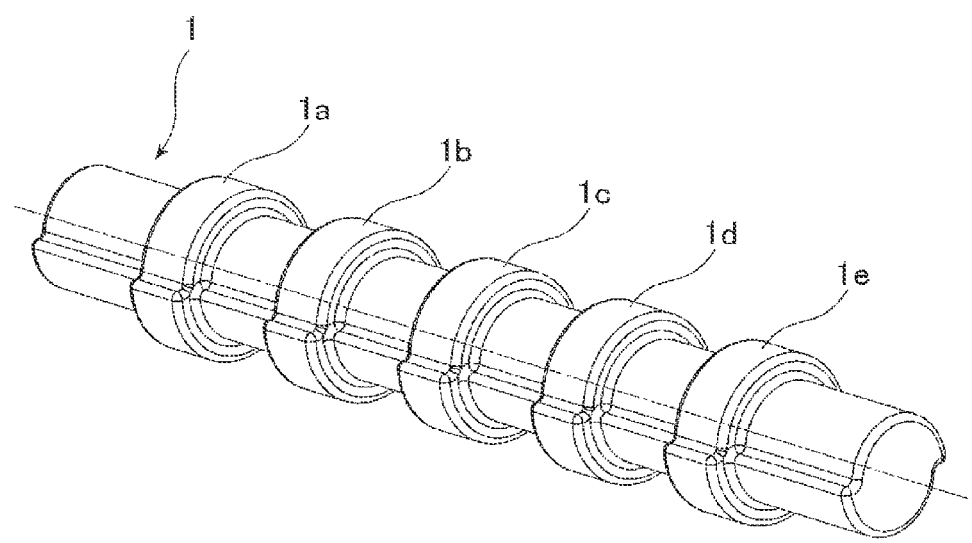
FIG. 5B is an external perspective view of an exemplary shaft blank that the exemplary embodiment of the present invention is applied.

FIGS. 5A and 5B illustrate an exemplary shaft blank to be machined by the center hole machining machine 10 according to the exemplary embodiment of the present invention. The shaft blank 1 is shaped by means of forging or casting using a top mold and a bottom mold. The shaft blank 1 illustrated in FIG. 5A is finished in a shape roughly satisfying designed values. Further, FIG. 5B illustrates the shape of a shaft blank 1 formed when the top and bottom molds are misaligned. The shaft blank 1 includes prospective machining portions 1a to 1e in five positions.

Structure of Center Hole Machining Machine

Figure 6:
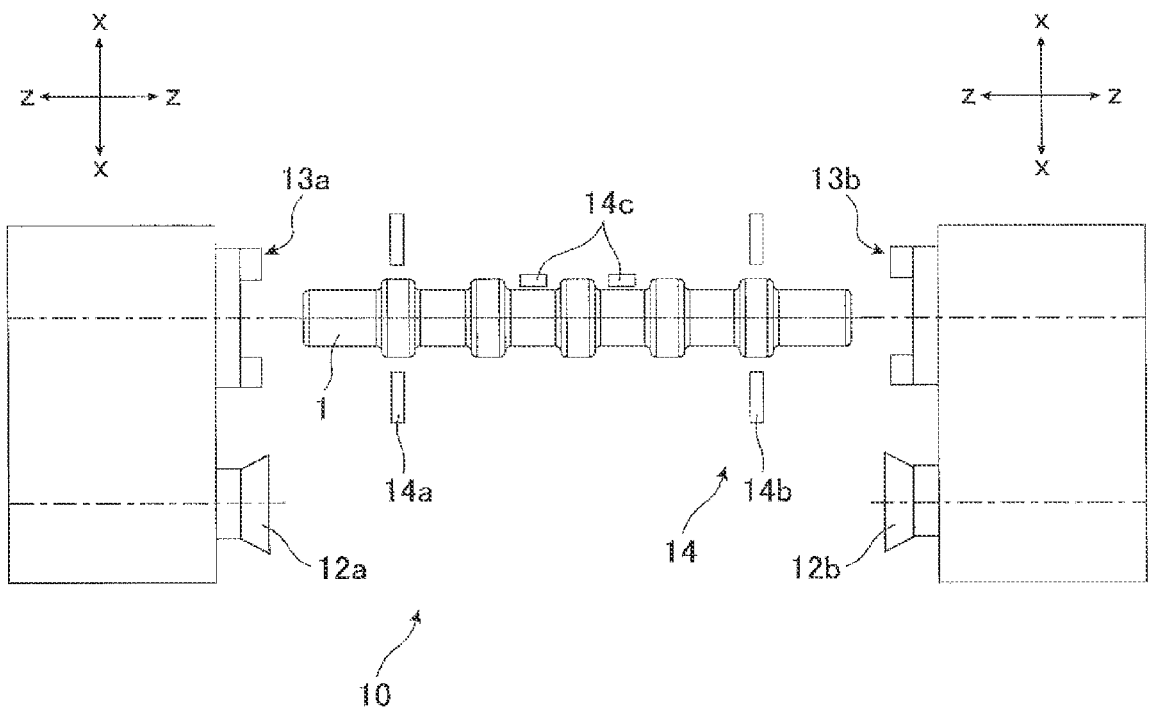
FIG. 6 is a schematic plan view of a center hole machining machine according to an exemplary embodiment of the present invention.

FIG. 6 is a schematic structural plan view of the center hole machining machine 10. The center hole machining machine 10 includes a pair of first and second machining parts 12a and 12b, a pair of first and second chucks 13a and 13b and a main clamper 14.

The first and second machining parts 12a and 12b are respectively movable in X, Y and Z-axis directions depicted in FIG. 6. It should be noted that the Y-axis direction is perpendicular to the X and Z-axis directions although not depicted in FIG. 6. The machining parts 12a and 12b are configured to mill the end surfaces of the shaft blank 1 and bore center holes in the end surfaces of the shaft blank 1.

The first and second chucks 13a and 13b are respectively centripetal chucks configured to be freely pivot along the blank shape in clamping the shaft blank 1. Each centripetal chuck includes three chuck pawls aligned at equal angular intervals and hold the both ends of the shaft blank 1 with the pawls. Further, the first and second chucks 13a and 13b are configured to be rotated in synchronization with each other by means of a rotary drive mechanism.

The main clamper 14 is configured to hold and fix the shaft blank 1. The main clamper 14 includes a pair of first clamping parts 14a, a pair of second clamping parts 14b and a pair of third clamping parts 14c. The first clamping parts 14a and the second clamping parts 14b respectively clamp the outer peripheries of the prospective machining portions 1a and 1e of the shaft blank 1 from a sideward direction (i.e., the X-axis direction). The third clamping parts 14c clamp the prospective machining portion 1c positioned in the axially center part of the shaft blank 1 while pressing it from its axially outer sides.

Control Processing of Center Hole Machining Machine

Figure 7B:
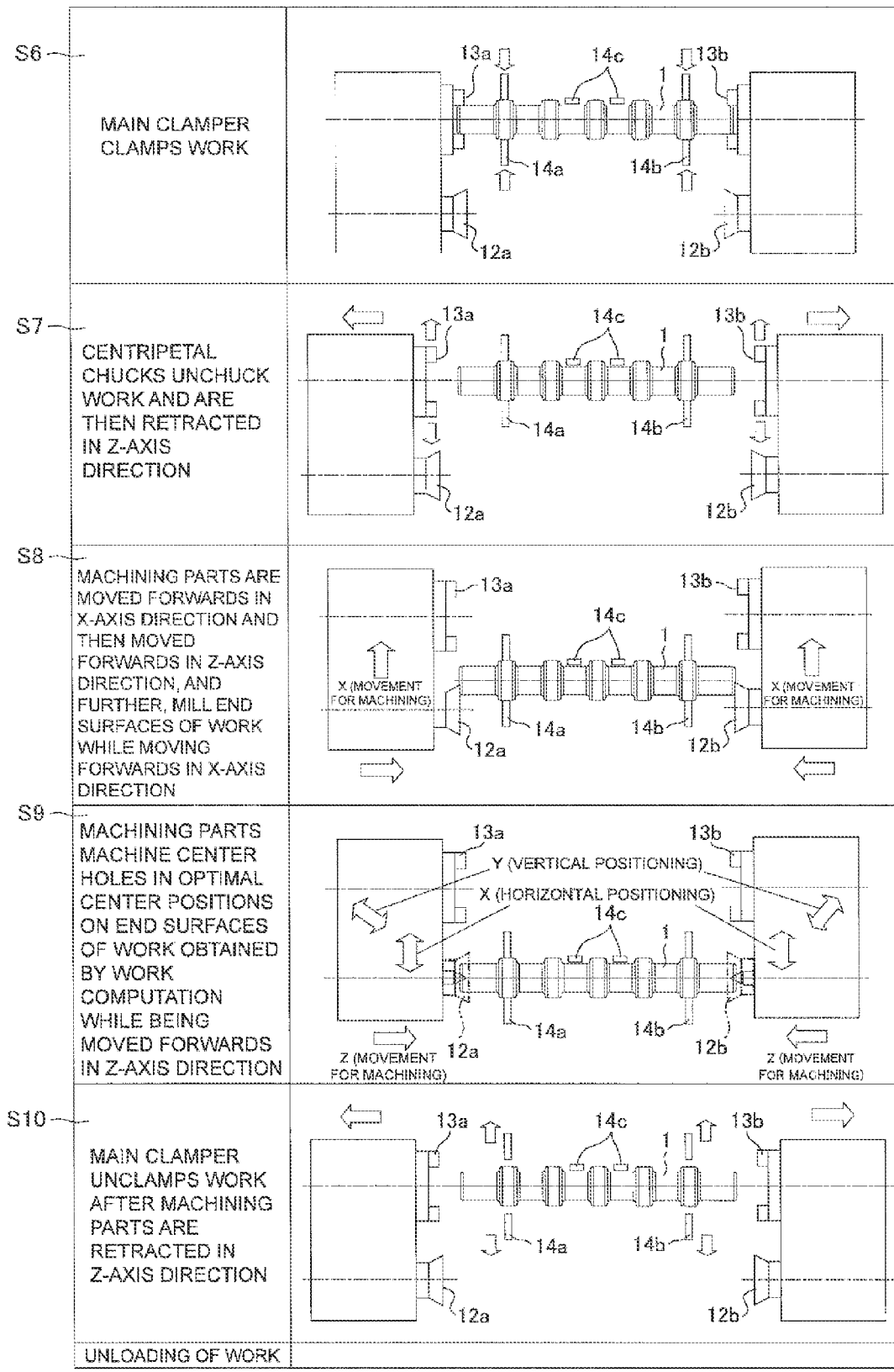
FIG. 7B is a part of the operational sequence diagram of the center hole machining machine.

A control processing of the center hole machining machine 10 structured as described above will be explained with reference to operational sequence diagrams of FIGS. 7A and 7B.

In Step S1 of FIG. 7A, the shaft blank 1 is disposed in the center position of the main clamper 14 and the prospective machining portion 1c of the shaft blank 1 is fixed for longitudinally (i.e., axially) positioning the shaft blank 1. The prospective machining portion 1c is herein clamped by the third clamping parts 14c of the main clamper 14 while being pressed by the third camping parts 14c from its axially outer sides.

Next in Step S2, the paired first clamping parts 14a clamp the prospective machining portion 1a disposed on one end of the shaft blank 1, while the paired second clamping parts 14b clamp the prospective machining portion 1e disposed on the other end of the shaft blank 1. Subsequently, the third clamping parts 14c unclamp the prospective machining portion 1c. Accordingly, the shaft blank 1 is supposed to be rigidly fixed by the main clamper 14.

In Step S3, the first and second centripetal chucks 13a and 13b are moved closer to the shaft blank 1 in the Z-axis direction while the shaft blank 1 is rigidly clamped by the main clamper 14. Further, the first and second centripetal chucks 13a and 13b hold the both ends of the shaft blank 1. Thus, the shaft blank 1 is herein rigidly clamped by the main clamper 14. The respective chuck pawls are thereby freely moved along the posture of the shaft blank 1 clamped by the main clamper 14 due to the features of the first and second centripetal chucks 13a and 13b, and hold the shaft blank 1 in the position. In other words, the shaft blank 1, herein held by the first and second centripetal chucks 13a and 13b, keeps the posture thereof clamped by the main clamper 14.

After the shaft blank 1 is thus held by the first and second centripetal chucks 13a and 13b, the first and second clamping parts 14a and 14b unclamp the shaft blank 1 in Step S4.

Next in Step S5, the first and second centripetal chucks 13a and 13b are rotated for rotating the shaft blank 1, and simultaneously, a laser displacement meter 11 is caused to scan the shaft blank 1 in the Z-axis direction. The shape data of the shaft blank 1 is thus obtained. A center axis for boring center holes is determined by comparing the shape data obtained in Step S5 with the design data. The processing for determining the center axis will be described below.

After measurement of the shape of the shaft blank 1 is completed in the aforementioned step S5, the posture of the shaft blank 1 is set to be identical to its posture in Step S3 prior to the shape measurement. Under the condition, in Step S6 of FIG. 7B, the shaft blank 1 is rigidly clamped by the first clamping parts 14a and the second clamping parts 14b of the main clamper 14 while being held by the first and second centripetal chucks 13a and 13b.

In Step S7, the first and second centripetal chucks 13a and 13b unclamp the shaft blank 1. Then, the respective chucks 13a and 13b are moved in directions away from the shaft blank 1.

Next in Step S8, the first and second machining parts 12a and 12b are moved towards the shaft blank 1 (i.e., in the X-axis direction) and are then moved in the axial direction (i.e., the Z-axis direction) of the shaft blank 1. Further, the both machining parts 12a and 12b are caused to mill the end surfaces of the shaft blank 1 while being further moved in the X-axis direction.

In the milling, the axial positions of the milled surfaces are determined by the third clamping parts 14c functioning as axial positioning clampers. However, the axial positions of the milled surfaces can be determined using the laser displacement meter 11 used for measuring the outer peripheral shape data of the shaft blank 1. More specifically, it is possible to determine the axial positions of the milled surfaces by causing the laser displacement meter 11 to scan the shaft blank 1 in the axial direction for measuring the axial shape of the shaft blank 1, and then, by performing a best-fit comparison of the measured result with the axial design data.

Next in Step S9, both of the machining parts 12a and 12b are moved in the X-axis direction and the Y-axis (i.e., vertical) direction based on the center hole positional data. It should be noted that the center hole positional data is obtained by a center axis determining processing to be described. After both of the machining parts 12a and 12b are moved to the center hole positions, drill bits respectively mounted on the machining parts 12a and 12b are driven and moved forwards in the Z-axis direction. Accordingly, center holes are bored in the end surfaces of the shaft blank 1 at the optimal center positions.

In Step S10, both of the machining parts 12a and 12b are retracted in the Z-axis direction. Further, the first and second clamping parts 14a and 14b of the main clamper 14 unclamp the shaft blank 1. The center hole machining processing is thus completed.

Processing of Determining Center Axis for Boring Center Holes

A processing of determining a center axis for boring center holes based on the measured data of the shaft blank 1 obtained in the aforementioned step S5 will be hereinafter explained based on a flowchart represented in FIG. 8.

First, an initial setting is executed in Step P1. In the initial setting, various processing will be executed, including setting a count valve N to be "0". It should be noted that the count value N is a value to be used for determining whether or not the shaft blank 1 is a defective product. Next in Step P2, the outer peripheral shape data of the shaft blank 1 obtained in Step S5 is obtained.

In Step P3, a center axis for boring center holes is calculated based on comparison between the outer peripheral shape data and the design data. Specifically, the outer peripheral shape data of the respective prospective machining portions, obtained by measurement, is not matched with the design data. Therefore, a center axis, averagely passing through all the prospective machining portions, is calculated by applying a least-square method to the measured data and the design data (true circle data).

Specifically, a least-square center is calculated for each prospective machining portion by executing the best-fit comparison between the outer peripheral data measured for each prospective machining portion and the design data for each prospective machining portion. In the present exemplary embodiment, all the portions of the shaft blank 1 are cylindrically formed. Therefore, the least-square method for a true circle is herein applied. When the shaft blank is formed in a particular shape (e.g., a cam shape), best-fitting based on the least-square method is applied to the design data of the particular shape. Then, a least-square axis, passing through the plural least-square centers, is calculated.

In Step P4, for each of the prospective machining portions, a minimum distance Rmin between the center axis obtained in Step P3 and the outer peripheral surface of the prospective machining portion is calculated, and the calculated minimum distance Rmin and a machining dimension R0 (included in the design data) are compared.

In Step P5, it is determined whether or not the minimum distance Rmin for each prospective machining portion is greater than the machining dimension R0. When it is determined the minimum distance Rmin is greater than the machining dimension R0, this means that machining allowance exists. In this case, there is no chance that the outer peripheral surface of the shaft blank 1 is left uneliminated after center holes are bored based on the center axis obtained in Step P3 and the shaft blank 1 is machined using the center holes. Therefore, the processing herein proceeds from Step P5 to Step P6 and the center axis obtained in Step P3 is set as the center axis for boring center holes without any changes.

When it is determined that the minimum distance Rmin is less than or equal to the machining dimension R0, by contrast, this means that no machining allowance exists. In this case, there are chances that the outer peripheral surface of the shaft blank 1 is left uneliminated after center holes are bored based on the center axis obtained in Step P3 and the shaft blank 1 is worked using the center holes. When the outer peripheral surface of the shaft blank 1 is left uneliminated, this means that the shaft becomes an inferior product when obtained as a final product. In this case, the processing proceeds from Step P5 to Step P7 and a numeric value N, representing frequency of execution of Step P4, is incremented. Next in Step P8, it is determined whether or not the numeric value N reaches "4". When it is not determined that the numeric value N reaches "4", the processing proceeds from Step P8 to Step P9.

In Step P9, the center axis is shifted by a minute amount in a direction of keeping machining allowance for all the prospective machining portions. Subsequently, the processing Steps P4 to P9 will be executed. When shifting the center axis results in a new center axis whereby machining allowance can be left, the newly obtained center axis is determined as the center axis for boring center holes (Step P6) and the processing is finished.

On the other hand, the processing proceeds from Step P8 to Step P10 when it is impossible to set a center axis whereby machining allowance can be left even after shifting of the center axis is executed three times. In Step P10, it is determined that the material misalignment amount of the shaft blank 1 is large enough to be unmodifiable. Accordingly, the shaft blank 1 is judged as an inferior product and is excluded from a production line.

Example

Shifting of a center axis will be specifically explained with reference to FIGS. 9A and 9B. It should be noted that FIG. 9A illustrates a case that machining allowance is insufficient in one position whereas FIG. 9B illustrates a case that machining allowance is insufficient in a plurality of positions.

Figure 9A:
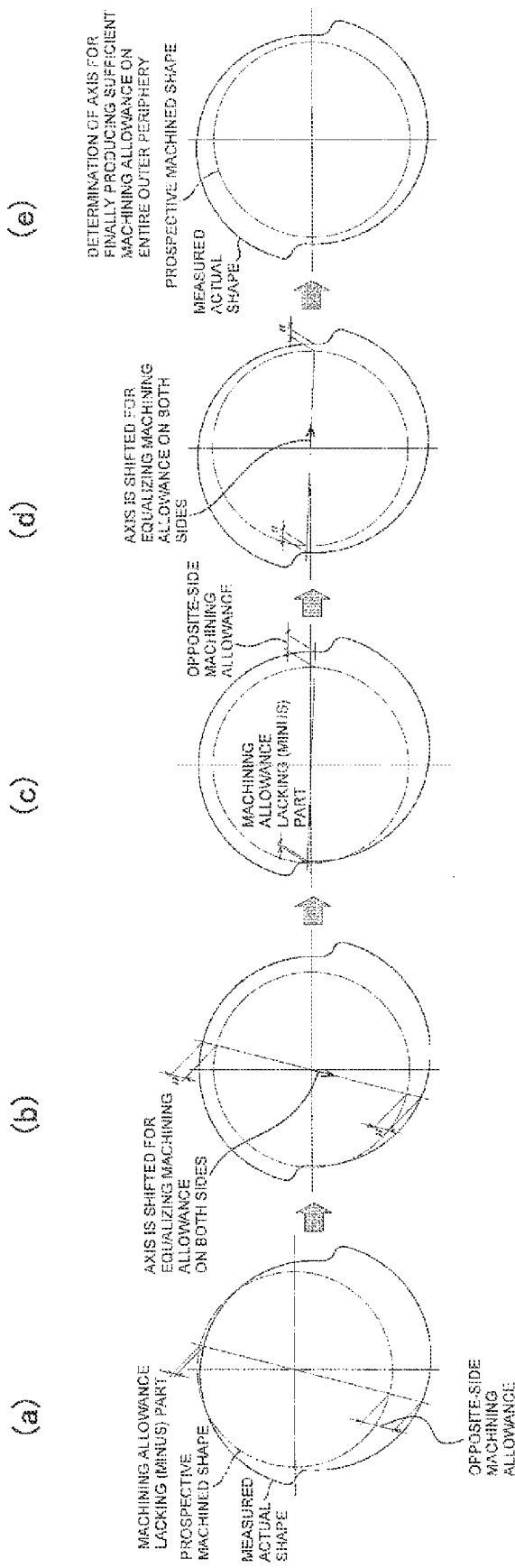
FIG. 9A is a diagram for explaining a processing of reliably producing a machining allowance by shifting a center axis.

As illustrated in a diagram (a) of FIG. 9A, when machining allowance is either "zero" or "minus" in one position (FIG. 9 exemplifies a case of "minus" machining allowance), the center axis is shifted on a straight line connecting the center axis and the prospective machining portion towards the opposite side of the position where machining allowance is insufficient, so that the same amount of machining allowance can be produced on the both radial sides as illustrated in a diagram (b) of FIG. 9A. When machining allowance becomes insufficient in another position after the shifting of the center axis as illustrated in a diagram (c) of FIG. 9A, the aforementioned processing is similarly executed (a diagram (d)). When the processing finally results in a center axis whereby machining allowance can be left on the entire outer periphery (a diagram (e)), the obtained center axis is determined as the center axis for boring center holes.

Figure 9B:
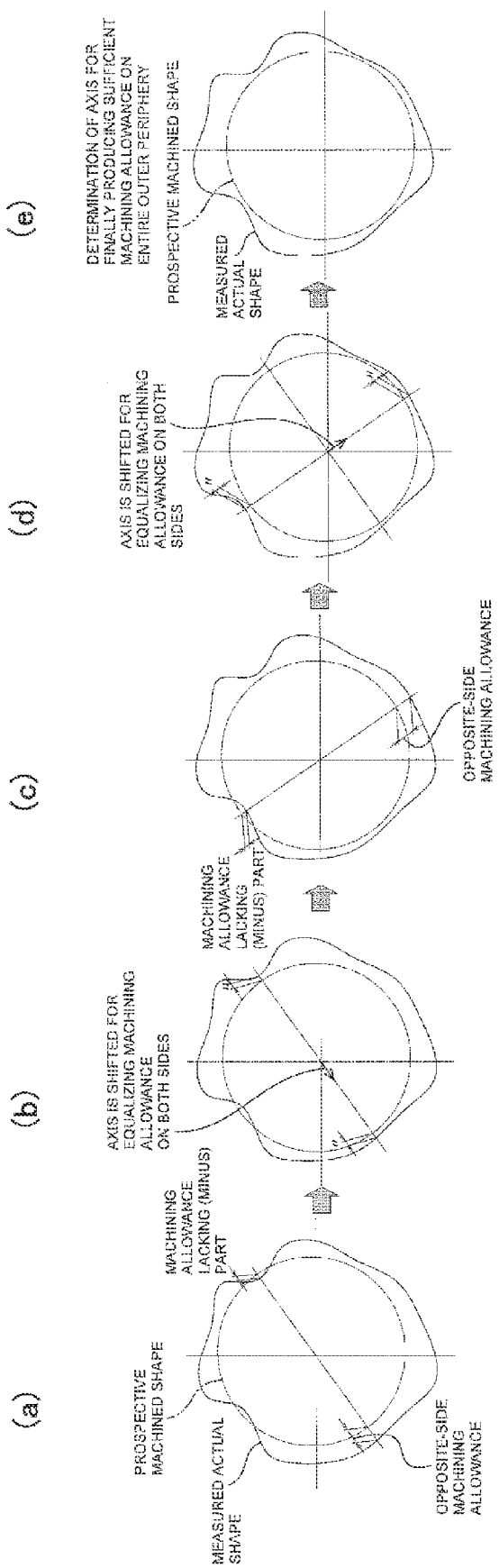
FIG. 9B is a diagram for explaining a processing of reliably producing a machining allowance by shifting a center axis.

On the other hand, when machining allowance is insufficient in a plurality of positions as illustrated in a diagram (a) of FIG. 9(B), the aforementioned processing will be similarly executed for the plural positions on a one-by-one basis (diagrams (b) to (d)). When the processing finally results in a center axis whereby machining allowance can be left on the entire outer periphery (a diagram (e)), the obtained center axis is determined as the center axis for boring center holes.

Features

According to the present exemplary embodiment as described above, center holes can be bored based on the center axis position calculated for uniformly producing machining allowance, even when portions of the shaft blank, closer to its both end surfaces, are clamped for preventing the shaft blank from easily wobbling in machining of its both end surfaces. Further, it is possible to reduce machining allowance as much as possible and thereby remarkably reduce material cost.

2. Second Exemplary Embodiment

Figure 10:
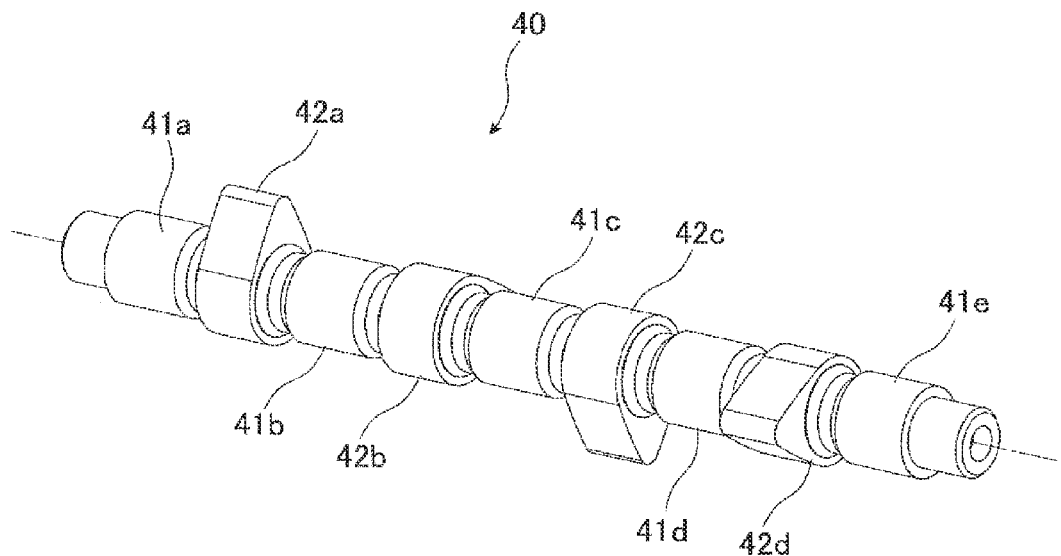
FIG. 10 is an external perspective view of another exemplary shaft blank that the exemplary embodiment of the present invention is applied.

The aforementioned exemplary embodiment has exemplified the case that the shaft blank is formed in a cylindrical shape. However, the present invention can be similarly applied to such a case that a cam shaft 40 is machined as illustrated in FIG. 10. In this case, the cam shaft 40 includes cylindrical journal portions 41a to 41e and cam portions 42a to 42d. Similarly to the aforementioned exemplary embodiment, the least-square method for a true circle is herein applied to the journal portions 41a to 41e. On the other hand, best-fitting based on the least-square method is applied to the design values of the cam shapes of the cam portions 42a to 42d. Further, as to the cam shapes, relative angles are preliminarily set among the respective cam portions. Therefore, a center axis is calculated by incorporating the relative angles into best-fit calculation.

3. Third Exemplary Embodiment

Figure 11:
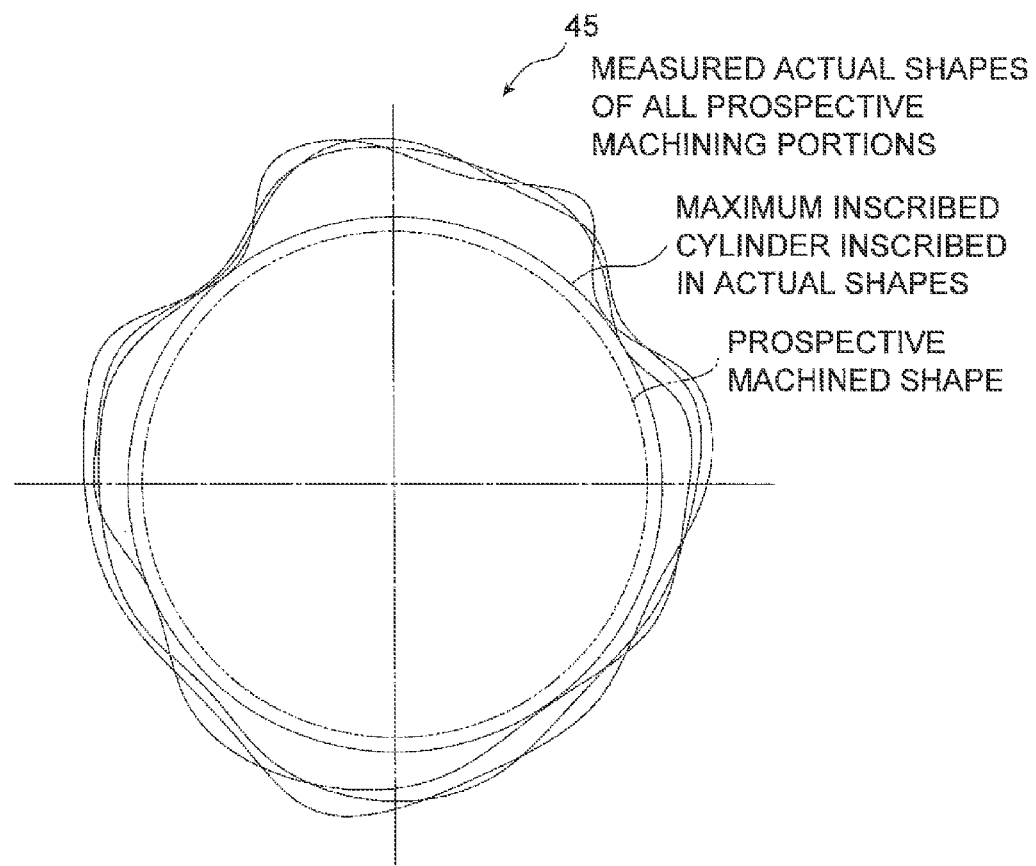
FIG. 11 is a diagram illustrating yet another exemplary shaft blank that the exemplary embodiment of the present invention is applied.

As a yet another exemplary embodiment, FIG. 11 illustrates a case that prospective machining portions are only cylindrical portions having the same diameter. In this case, the shape data is firstly obtained for all the prospective machining portions by measuring the outer peripheral shape of a shaft blank 45. Then, a least-square center in each cylindrical portion is calculated based on the obtained shape data. Next, calculation is executed for obtaining a least-square axis passing through the plural least-square centers thus calculated.

Figure 8:
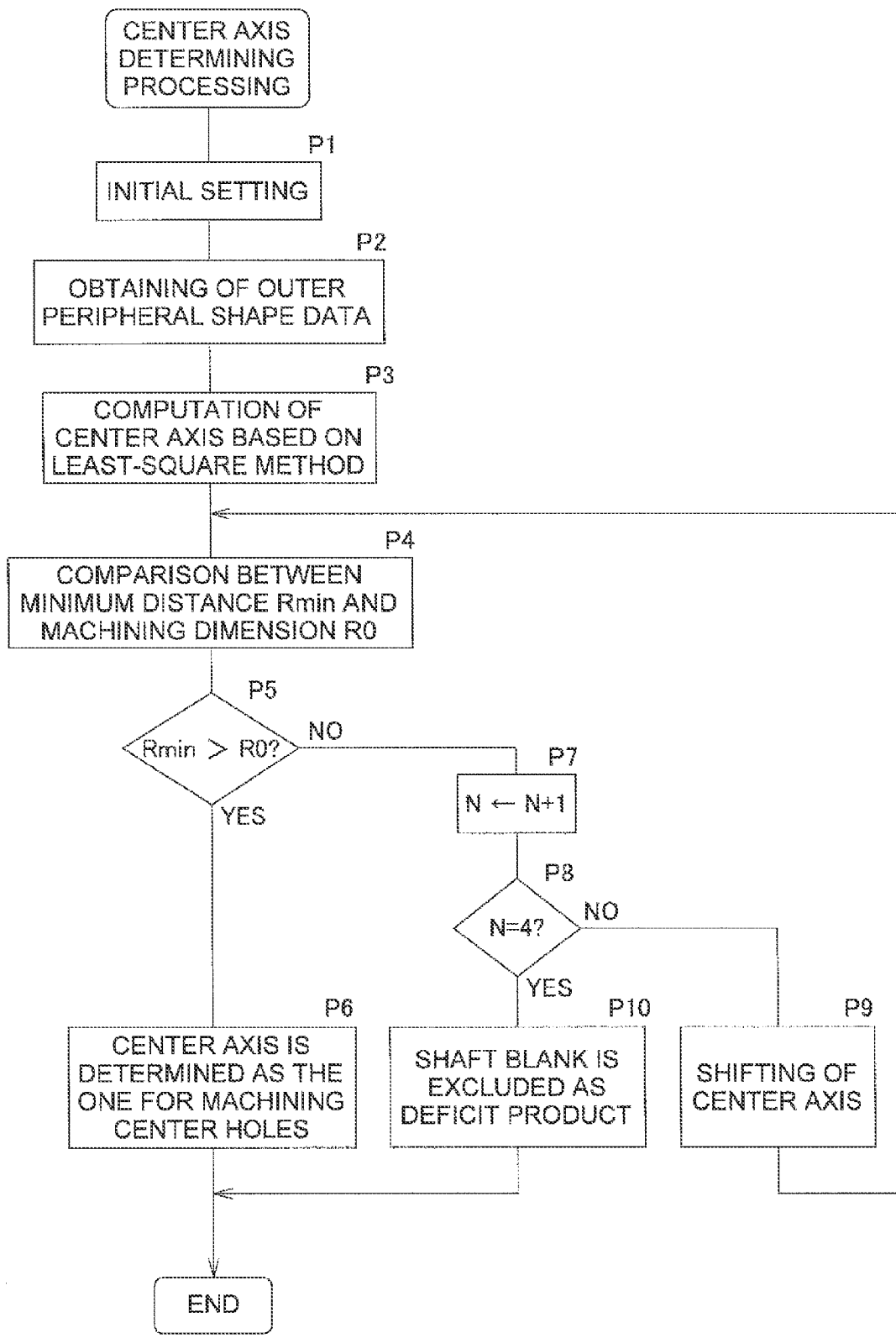
FIG. 8 is a control flowchart of a center axis determining processing.

After the center axis is thus obtained, the subsequent processing is similar to that of the aforementioned exemplary embodiment and a series of processing from Steps P4 to P10 in FIG. 8 is executed. It should be noted that the processing of shifting the center axis is executed only once as described below. Specifically, the processing of "N=4?" in Step P8 is substituted with "N=2?".

In the case of the shaft blank 45 as illustrated in FIG. 11, it is required in the shifting processing of Step P9 to translate the above-calculated center axis to the center of the maximum inscribed cylinder (see FIG. 11) that is inscribed in all the prospective machining portions and has a shaft blank shape. When it is determined that no machining allowance exists even after translation of the center axis, the shaft blank is immediately excluded as an inferior product without executing the shifting processing again. This is due to the fact that, even if the center of the maximum inscribed cylinder is calculated again, a result is the same as that of the processing in the foregoing step and the substantial displacement amount will be "0". In other words, when calculation is executed once for obtaining a center of the maximum inscribed cylinder that is inscribed in all the prospective machining portions and has a shaft blank shape and no machining allowance exists even after a center axis is shifted to the calculated center, it is possible to immediately exclude the shaft blank as an inferior product because there is no longer any room left for modification.

4. Fourth Exemplary Embodiment

Figure 12A:
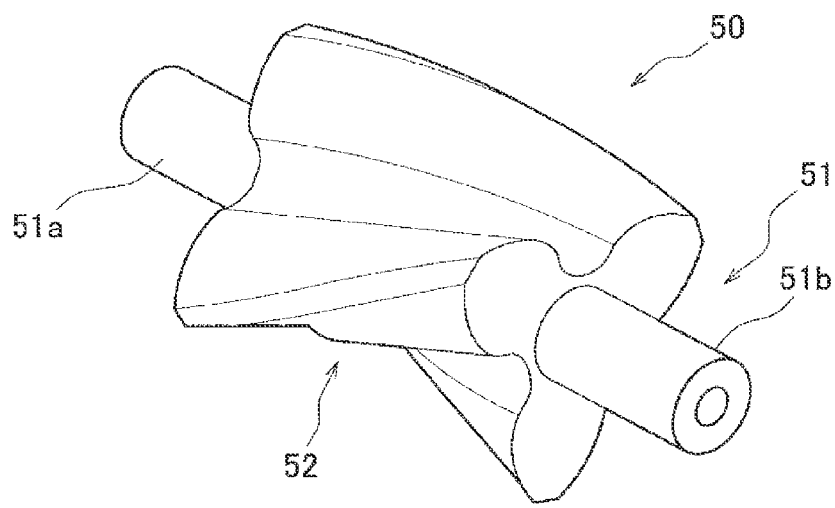
FIG. 12A is a diagram illustrating further yet another exemplary shaft blank the exemplary embodiment of the present invention is applied.

FIG. 12A illustrates a three-lobe twist rotor 50 for a roots blower. The twist rotor 50 is formed by means of casting. In the twist rotor 50, shaft portions 51a and 51b on the both ends thereof and a rotor portion 52 therebetween are molded in different casting molds. Therefore, chances are that the molds are misaligned from each other. When such mold misalignment is caused, the centers of the both end shaft portions 51a and 51b and the center of the rotor portion 52 are supposed not to be matched. Under the condition, when the positions of center holes are determined based on the both end shaft portions 51a and 51b in the well-known method, machining deficit is caused in machining the rotor portion based on the center holes.

Figure 12B:
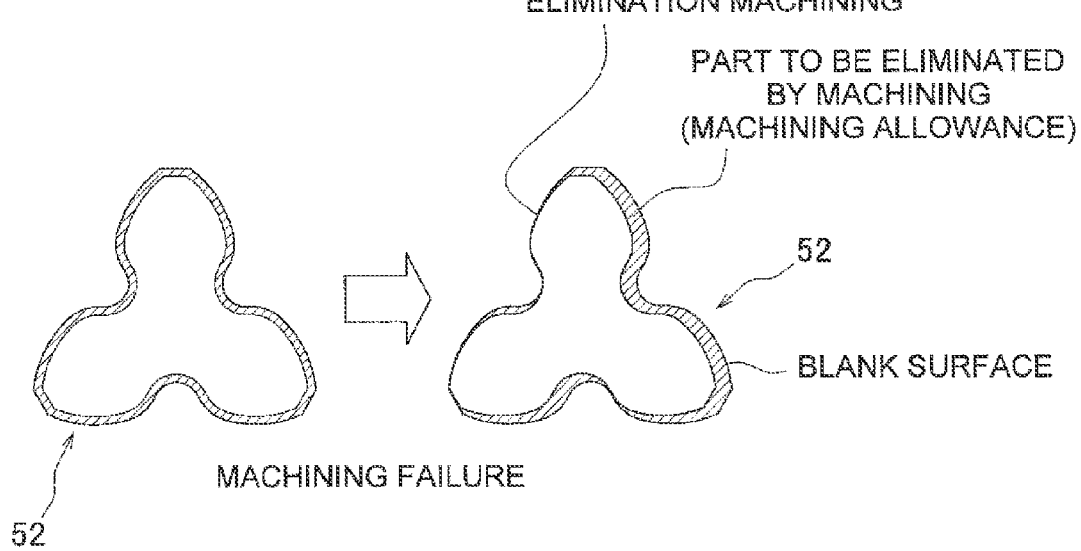
FIG. 12B is a diagram illustrating an example of a machining failure caused in the shaft blank illustrated in FIG. 12A.

FIG. 12 B illustrates a condition of machining deficit. A diagram (a) of FIG. 12B depicts machining allowance in the design data with hatched lines. As illustrated in the diagram, uniform machining allowance is set on the entire outer periphery of the rotor portion 52 in the design data. On the other hand, a diagram (b) of FIG. 12B illustrates a case that center holes are bored based on the well-known method and the rotor portion 52 is machined when mold misalignment is caused and therefore the centers of the both end shaft portions 51a and 51b and the center of the rotor portion 52 are not matched. As is obvious from the diagram, a blank surface is left on a part of the outer periphery of the rotor portion 52.

Even in determining center holes of the twist rotor 50 as structured above, the rotor portion 52 can be machined without leaving the blank surface on the outer periphery thereof by the application of the present invention.

Specifically, actual shape data is firstly obtained for the rotor portion 52 by measuring the outer peripheral shape of the rotor portion 52 in a plurality of axial positions. Next, least-square centers in the plural axial positions are calculated for the rotor portion 52 through the best-fitting between the obtained shape data and the design data indicating the ideal shape of the rotor portion 52. Next, based on the least-square centers in the plural axial positions, a line closest to all the least-square centers (i.e., a center axis) is further calculated based on the least-square method. Next, a distance from the calculated center axis to the outer peripheral surface of the measured rotor portion is calculated. Based on this, it is calculated and determined whether or not the blank surface is left on the entire outer periphery of the rotor portion 52. When it is determined that the blank surface is left, the center axis is shifted in a direction of eliminating the blank surface. Then, the aforementioned calculation simulation is executed again. Finally, the center axis is set for producing a predetermined amount of machining allowance on the entire outer periphery of the rotor portion. Then, center holes are bored in the end surfaces of the both end shaft portions 51a and 51b in positions arranged on the extension of the center axis.

In the exemplary embodiment thus configured, even when the twist rotor as a work is not properly clamped, a series of actions from measurement to machining are executed under the condition similarly to the aforementioned respective exemplary embodiments. Therefore, center holes can be bored in appropriate positions. Further, machining allowance can be reduced.

It should be noted that, similarly to the aforementioned exemplary embodiments, a material is excluded as an inferior product when machining allowance cannot be reliably produced even after shifting of the center axis.

According to the center hole machining method and the center hole machining apparatus, it is possible to appropriately set a position of a center hole and prevent a blank surface from remaining on a shaft blank after machining even when the machining allowance of the shaft blank is set to be small. Therefore, material cost can be reduced.

The invention claimed is:

1. A center hole machining method for a shaft blank, the center hole machining method configured to machine a center hole for processing an outer periphery of the shaft blank formed by forging or casting, the center hole machining method comprising:

a first step of obtaining outer peripheral shape data of a plurality of portions of the shaft blank in an axial direction;

a second step of obtaining a center axis for determining the center hole by comparing measured data of the plurality of portions of the shaft blank with design data corresponding thereto;

a third step of calculating a minimum distance from the center axis to the outer periphery in each of the plurality of portions of the shaft blank;

a fourth step of:
- determining the center axis as an appropriate center axis when the minimum distance in each of the plurality of portions is greater than a machining dimension; and
- shifting the center axis in a direction of making the minimum distance greater than the machining dimension and repeatedly executing the third step based on the shifted center axis when the minimum distance is less than or equal to the machining dimension; and a fifth step of boring the center hole in an end surface of the shaft blank at a position arranged on a line extended from the center axis determined as the appropriate center axis.

2. The center hole machining method for a shaft blank recited in claim 1, wherein
the fourth step includes a step of determining the shaft blank as an inferior product and excluding the shaft blank from a machining line when the minimum distance remains less than the machining dimension even after the center axis is shifted at a predetermined number of times.

3. The center hole machining method for a shaft blank recited in claim 1, wherein
the second step is a step of obtaining the center axis for determining the center hole using a least-square method.

4. The center hole machining method for a shaft blank recited in claim 1, wherein
the fifth step includes:
- a milling step of milling both end surfaces of the shaft blank; and
- a drilling step of boring a center hole in each of the both milled end surfaces of the shaft blank.

5. A center hole machining apparatus for a shaft blank configured to bore a center hole for machining an outer periphery of the shaft blank formed by forging or casting, the center hole machining apparatus comprising:
- a shape data obtaining unit configured to obtain outer peripheral shape data of a plurality of portions of the shaft blank in an axial direction;
- a center axis calculating unit configured to obtain a center axis for determining the center hole by comparing measured data of the plurality of portions of the shaft blank with design data corresponding thereto;
- a minimum distance calculating unit configured to calculate a minimum distance from the center axis to the outer periphery in each of the plurality of portions of the shaft blank;
- a center axis determining unit configured to:
  - determine the center axis as an appropriate center axis when the minimum distance in each of the plurality of portions is greater than a machining dimension; and
  - shift the center axis in a direction of making the minimum distance greater than the machining dimension and repeatedly execute the processing of calculating the minimum distance based on the shifted center axis when the minimum distance is less than or equal to the machining dimension; and
- a center hole machining unit configured to bore the center hole in an end surface of the shaft blank at a position arranged on a line extended from the center axis determined as the appropriate center axis.

* * * * *